United States Patent Office 3,138,639
Patented June 23, 1964

3,138,639
TERTIARY AMINES AND A PROCESS FOR PRODUCING SAME
Arnold Brossi, Riehen, and Alfred Rheiner, Jr., Binningen, Switzerland, assignors to Hoffmann-La Roche Inc., Nutley, N.J., a corporation of New Jersey
No Drawing. Filed Apr. 18, 1962, Ser. No. 188,577
Claims priority, application Switzerland Apr. 21, 1961
7 Claims. (Cl. 260—570.5)

This invention relates, in general, to tertiary amines and to a process for producing same. More particularly, the invention relates to a class of therapeutically active tertiary amines having the formula

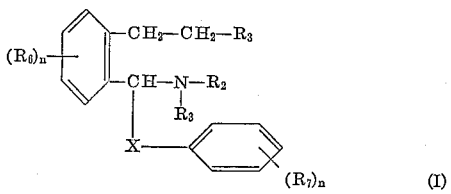

in which $R_2$ is a lower alkyl group; $R_3$ is hydrogen or a lower alkyl group; $R_5$ is a lower alkyl group; $R_6$ is a methoxy group or a hydroxy group; $R_7$ is fluorine, chlorine or bromine or a nitro group; X is a divalent hydrocarbon radical having two or more carbon atoms, the valences of which are separated from each other by two carbon atoms; and in which $n$ represents the integer 1 to 3, inclusive, salts of such amines with medicinally acceptable acids and to processes for producing such amines and the salts thereof.

In the practice of this invention, an isoquinoline compound having the general formula

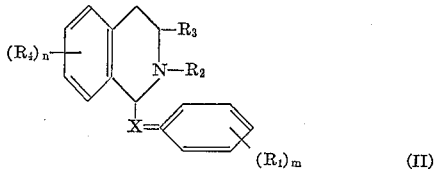

in which $R_2$, $R_3$, X and $n$ have the same meanings set forth heretofore; and in which $R_1$ is fluorine, chlorine or bromine; $R_4$ is methoxy or benzyloxy; and $m$ is 0 or the integer 1 to 3, inclusive, is employed as the starting material. The isoquinoline compound of Formula II is reacted in the first step of the process with an alkylating agent to form the quaternary compound corresponding thereto. The quaternary compound is, in turn, converted, by a Hofmann degradation reaction, into a compound having the formula

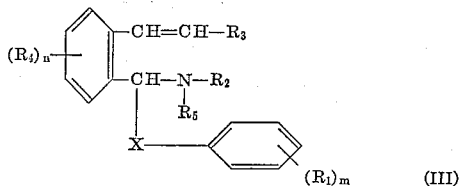

in which $R_1$, $R_2$, $R_3$, $R_4$, $m$, $n$, and X have the same meanings as in Formula II, supra, and wherein $R_5$ is a lower alkyl group.

The product of Formula II is thereafter hydrogenated at the carbon-double bond in the side chain. Additionally, where the compound which is subjected to hydrogenation in this step of the process contains a benzyloxy group as the $R_4$ component, such compound is debenzylated also during the course of the hydrogenation reaction, with the benzyloxy group being converted into a hydroxy group. Furthermore, in a particular embodiment of the invention, namely, in the case of a compound of Formula III in which the symbol $m$ represents 0, the hydrogenated product of Formula IV which is obtained therefrom is subsequently nitrated. Hydrogenation of a compound of Formula III, or, in the alternative, hydrogenation of a compound of Formula III in which symbol $m$ represents 0 and subsequent nitration of the hydrogenated compound thus produced, yields a tertiary amine having the formula

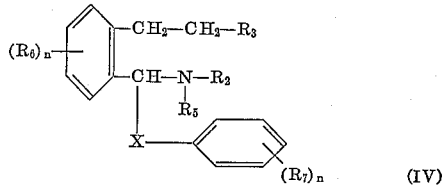

in which $R_2$, $R_3$, $R_5$, $R_6$, $R_7$, $n$ and X have the same meanings as in Formula I supra.

These tertiary amines can, if desired, be converted into the corresponding salts by reacting same, for example, with medicinally acceptable acids.

The groups which are represented in the foregoing formulas by the symbols $R_2$, $R_3$ and $R_5$ are lower alkyl groups, as, for example, alkyl groups having a carbon chain length of from 1 to 4 carbon atoms, inclusive. As examples of such groups, methyl, ethyl, propyl, isopropyl and butyl may be mentioned. Ethylene groups and isopropylene groups are examples of the divalent hydrocarbon radicals which, in the foregoing formulas, are represented by the symbol X. The preferred compounds of the invention are obtained when there is used as the starting material an isoquinoline compound of Formula II, in which the symbol $R_2$ represents a methyl group; the symbol $R_3$ represents two methoxy groups, one substituted in the 6-position and the other substituted in the 7-position of the isoquinoline nucleus; and in which the symbol X represents an ethylene group.

Certain of the starting materials which fall within the scope of Formula II, supra, namely, those in which $R_4$ represents methoxy groups, are known compounds. They can be prepared, for example, by condensing a phenethylamine, which is suitably substituted with methoxy groups in the aromatic ring, with phenylpropionic acid which is substituted, if desired, in the α-position and/or the β-position with an alkyl group. The phenethylamine employed can have an alkyl group substituted in the α-position. The amide which is formed by the reaction of such amine with such acid is cyclized to the corresponding 1-phenylalkyl-3,4-dihydroisoquinoline derivative and subsequently the latter is reduced. The resulting substituted tetrahydroisoquinoline is thereafter alkylated on the nitrogen atom. A 1-phenethyl-2-methyl-6,7-dimethoxy-1,2,3,4-tetrahydroisoquinoline, the phenyl group of which is substituted with one or two halogen atoms, as, for example, 1 - (4-chlorophenethyl)-2-methyl-6,7-dimethoxy - 1,2,3,4-tetrahydroisoquinoline, 1 - (3,4 - dichlorophenethyl)-2-methyl-6,7-dimethoxy - 1,2,3,4 - tetrahydroisoquinoline, is the preferred starting material.

The starting materials of Formula II, supra, in which $R_4$ represents benzyloxy groups are novel compounds. For this reason, a description of the process by which such compounds are obtained will be given hereinafter. It should be fully understood, however, that such description is included herein solely for the sake of completeness. In and of themselves, neither the benzyloxy substituted starting materials, nor the process by which they are produced, constitute a part of the present invention. In producing such compounds an appropriately substituted phenethylamine, for example, 3-benzyloxy-4-methoxy-phenethylamine, 3 - methoxy-4-benzyloxy-phenethylamine, etc., is condensed with a nuclear halo-substituted β-phenylpropionic acid, which acid can have an alkyl group substituted in the α- and/or β-position. The amide, thus obtained, is cyclized to form the corresponding 1-phenethyl-3,4-dihydroisoquinoline. The latter compound is hydrogenated using a chemical reducing agent, such as, an alkali metal-metal hydride, for example, sodium borohydride, to yield the corresponding tetrahydroisoquinoline derivative. The tetrahydroisoquinoline compound is, then, alkylated, preferably by treating same with formaldehyde and subsequently the product is reduced with hydrogen in the presence of a catalyst, such as, Raney nickel.

In the first step of the present process, the starting material of Formula II is reacted with an alkylating agent to obtain the corresponding quaternary isoquinolinium compound. As the quaternizing agent, one can employ, for example, an alkyl halide, such as, methyl iodide, ethyl bromide, propyl iodide, etc. Alternatively, an alkyl sulfate, such as, dimethyl sulfate, diethyl sulfate, etc., can be used.

Quaternization with a methylating agent is preferred, however. The quaternization reaction is carried out conveniently in a suitable organic solvent. Acetone and ethyl acetate have been found to be especially well suited for use. As an example of but one method by which quaternization can be accomplished, the starting material of Formula II is allowed to react for a few hours at room temperature, with an equivalent quantity of alkylating agent. As a rule, the desired quaternary salt precipitates out to yield a crystalline product.

In the next step of the process, the quaternary salt intermediate, the preparation of which is described in the preceding paragraph, is converted by a Hofmann degradation-type reaction into the product of Formula III. The production of such compound can be accomplished in the following manner. First, the quaternary salt is converted to the corresponding quaternary ammonium hydroxide, conveniently by treatment with silver oxide. Preferably, this is accomplished using an aqueous alcohol solvent medium. After removal of the undissolved silver salt by filtration and concentration of the reaction mixture, the mostly oily quaternary hydroxide compound is subjected to pyrolysis, to produce, by ring opening, the compound of Formula III. The opening of the ring can be accomplished conveniently by heating the quaternary hydroxide compound at a temperature within the range of from about 100° C. to about 200° C. Preferably, however, a temperature within the range of from about 150° C. to about 170° C. is utilized. However, the conversion of the quaternary salt into the product of Formula III can also be carried out by heating said compound in an aqueous alkali medium, as, for example, by heating same 24 hours at reflux in a 20% aqueous solution of potassium hydroxide.

In a subsequent step of the process, the carbon-double bond of the side chain of the product of Formula III is hydrogenated. This can be accomplished by any one of the various known reduction procedures. However, the hydrogenation is preferably carried out using hydrogen in the presence of metal catalyst, such as Raney nickel, platinum oxide, palladium-carbon, etc. In the practice of this invention, either the free base, or a suitable acid addition salt thereof, e.g., a hydrohalide salt of the base, can be hydrogenated. Hydrogenation can be accomplished conveniently using a suitable solvent such as alcohol, for example, methanol or ethanol, or aqueous alcohol or ethyl acetate or water. Hydrogenation takes place even at room temperature and atmospheric pressure. Hydrogenation of the products of Formula III, in which $R_4$ represents a benzyloxy group, results in the debenzylation of the compound and, hence, in the production of compounds of Formula IV is which $R_6$ represents a hydroxy group. Debenzylation, which occurs simultaneously with the hydrogenation, takes place in the presence of a suitable catalyst, for example, in the presence of palladium or a palladium-containing catalyst, such as, palladium black, palladium carbon, etc.

In the case of those products of Formula III, in which the symbol $m$ represents 0, after the hydrogenation thereof, they are nitrated by reacting same, with concentrated nitric acid in glacial acetic acid, with cooling.

The process of the present invention furnishes the tertiary amines of Formula IV, generally in the form of a colorless to light yellow colored oils. These products can be distilled under high vacuum without decomposing. They can, by addition of an inorganic acid, such as, hydrochloric acid, hydrobromic acid, sulfuric acid, phosphoric acid, etc., or an organic acid, such as, fumaric acid, tartaric acid, citric acid, methane sulfonic acid, etc., be converted into their salts.

The products produced in the practice of the present invention contain at least one asymmetrical carbon atom. This corresponds to $C_1$ carbon ring atom of the isoquinoline nucleus of the starting material (Formula II). Where the symbol X in Formula II represents a branched chain, there can arise further asymmetry. When a racemic starting material is used, a racemic end product will be obtained. Often, however, it is desirable to produce the end products in the form of their optical antipodes. This can be readily accomplished, for example, either by using an optically active starting material or, optionally, by using a racemic starting material and separating the optical antipodes after the Hofmann degradation step. One method for accomplishing such separation is known, and it involves for example, the fractional crystallization of the salts with an optically active acid, such as, d-tartaric acid, dibenzoyl-d-tartaric acid, or D-camphorsulfonic acid.

The products of this invention, including the acid addition salts, possess analgesic, spasmolytic, antitussive and blood-pressure lowering properties. These products can be used as such, or in admixture with other compounds, and they can be embodied in a form suitable for enteral or parenteral administration. For example, the present products can be mixed with inert adjuvants, either organic or inorganic in nature, such as, water, gelatin, lactose, starch, magnesium stearate, talc, vegetable oils, gums, polyalkylene glycols, vaseline, etc. These pharmaceutical preparations can be provided in the form of tablets, dragées, suppositories, or they can be incorporated in suitable capsules. Additionally, they may be provided in liquid form, for example, as solutions, suspensions or emulsions. If desired, the products may be sterilized and/or mixed with adjuvant materials such as preservatives, stabilizers, wetting or emulsifying agents, salts for altering osmotic pressure or buffers. If desired, the present products can be used in admixture with other therapeutically valuable substances.

For a further understanding of the nature and objects of this invention, reference may be had to the following examples which are given merely as further illustrations of the invention and are not to be construed in a limiting sense.

*Example 1*

10 grams of 1-(4-chlorophenethyl)-2-methyl-6,7-dimethoxy-1,2,3,4-tetrahydroisoquinoline were dissolved in 150 ml. of acetone at a temperature slightly above room temperature and 4.1 grams of methyl iodide were added to, and mixed with, the solution thus obtained. The mixture was allowed to stand overnight and a precipitate formed. This precipitate was recrystallized from methanol-ether. There was obtained 12.4 grams of 1-(4-chlorophenethyl) - 2,2 - dimethyl - 6,7 - dimethoxy - 1,2,3,4-tetrahydroisoquinolinium iodide having a melting point of 196–198° C. and ultraviolet absorption maxima (in ethanol) at 280 and 284 m$\mu$; $\epsilon$=3680 and 3710.

12.4 grams of the 1-(4-chlorophenethyl)-2,2-dimethyl-6,7-dimethoxy - 1,2,3,4 - tetrahydroisoquinolinium iodide, obtained by the method described in the preceding paragraph, were dissolved in 150 ml. of methanol. To this solution 15 ml. of water and 13 grams of silver oxide were added. The mixture was stirred at room temperature for a period of about four hours. The mixture was filtered and the filtrate was concentrated under water vacuum and the oily residue, thus obtained, was heated for about 30 minutes at 150° C. to 170° C. bath temperature. After cooling, the residue was taken up in ether and the basic portion was extracted with 2 N sulfuric acid. The basic portion of the sulfuric acid extract was precipitated by the addition of dilute sodium hydroxide until alkali in reaction. The precipitate was thereafter taken up in ether. After drying and concentrating the ether solution, the residue, thus obtained, yielded, after distillation under high vacuum, 8.8 grams of 1-(2-vinyl-4,5-dimethoxy-phenyl) - 1 - dimethylamino - 3 - (4 - chlorophenyl)-propane in the form of a bright yellow oil having a boiling point of 163° C. to 165° C. at 0.015 mm. and ultraviolet absorption maxima, in ethanol, at 260 and 292 m$\mu$; $\epsilon$=13760 and 3870. This compound, when mixed with methyl iodide, was converted to the corresponding methyl iodide derivative. The latter had a melting point of 138° C. to 139° C. The D-camphor sulfonate derivative of the racemic tertiary base melted at 202° C. to 203° C.

For the purpose of reducing the vinyl group therein, 2.0 g. of the aforementioned tertiary base were dissolved in 50 ml. of methanol and hydrogenated using 40 mg. of platinum oxide. After removal of the catalyst by filtration, the filtrate was concentrated and the residue distilled under high vacuum. This yielded 1.8 grams of racemic 1 - (2 - ethyl - 4,5 - dimethoxy - phenyl) - 1 - dimethylamino-3-(4-chlorophenyl)-propane having a boiling point of 155 to 157° C. at 0.015 mm., and ultraviolet absorption maxima, in ethanol, at 284 m$\mu$; $\epsilon$=3810. That compound, in acetone solution, formed the D-camphor sulfonate of the racemic base melting at 208° C. to 209° C.

*Example 2*

(+)-1-(4-chlorophenethyl) - 2 - methyl-6,7-dimethoxy-1,2,3,4-tetrahydroisoquinoline [boiling point 196–198° C. at 0.06 mm.; $[\alpha]_D^{25}$=+17.9° (c.=1.0 in methanol) prepared from the racemate by the method described in Helv. Chim. Acta 43, 1472 (1960)], was subjected to the reaction steps described in Example 1. The following products were obtained:

(+)-1-(4-chlorophenethyl)-2,2-dimethyl-6,7 - dimethoxy-1,2,3,4-tetrahydroisoquinolinium iodide having a melting point of 98° C. to 100° C. (from water); $[\alpha]_D^{23}$=+16° (c.=1 in methanol).

(−)-1-(2-ethyl - 4,5 - dimethoxy-phenyl) - 1 - dimethylamino-3-(4-chlorophenyl)-propane which distilled at a bath temperature of 200° C. under a pressure of 0.02 mm. $[\alpha]_D^{22}$=−12.4° (c.=1.4 in methanol). That compound in acetone solution formed the (+)-camphor sulfonate salt melting at 164° C. to 165° C.; $[\alpha]_D^{23}$=+16.4° (c.=1 in methanol).

*Example 3*

1-(3,4-dichlorophenethyl) - 2 - methyl - 6,7 - dimethoxy-1,2,3,4-tetrahydroisoquinoline was subjected to the reaction steps described in Example 1 to yield the following products:

1-(3,4-dichlorophenethyl)-2,2-dimethyl - 6,7 - dimethoxy-1,2,3,4-tetrahydroisoquinolinium iodide having a melting point of 180° C. to 181° C. (from methanol and ether) and ultraviolet absorption maxima (in ethanol) at 282 m$\mu$; $\epsilon$=4010.

1-(2-vinyl-4,5-dimethoxy-phenyl) - 1 - dimethylamino-3-(3,4-dichloro-phenyl)-propane having a boiling point of 189 to 191° C. at 0.1 mm. and ultraviolet absorption maxima (in ethanol) at 262 m$\mu$ and 295 m$\mu$; $\epsilon$=13100 and 3810.

Racemic 1-(2-ethyl-4,5-dimethoxy-phenyl) - 1 - dimethylamino-3-(3,4-dichloro-phenyl)-propane having a boiling point of 190 to 192° C. at 0.07 mm. and ultraviolet absorption maxima (in ethanol) at 282 and 288 (shoulder) m$\mu$; $\epsilon$=3890 and 3180. The D-camphor sulfonate derivative of this racemic base melted at 207–208° C.

*Example 4*

(+)-1-(3,4-dichlorophenethyl) - 2 - methyl - 6,7 - dimethoxy-1,2,3,4-tetrahydroisoquinoline [melting point 55°–56° C.; $[\alpha]_D^{26}$=+11.0° (c.=1, methanol)] was subjected to the reaction steps described in Example 1 to yield the following compounds:

1 - (2 - vinyl-4,5-dimethoxy-phenyl)-1-dimethylamino-3-(3,4-dichlorophenyl)-propane having a boiling point of 175°–179° C. at 0.01 mm.; $[\alpha]_D^{24}$=−12.5 (c.=1.0 methanol).

(−)-1-(2-ethyl-4,5-dimethoxy - phenyl)-1-dimethylamino-3-(3,4-dichlorophenyl)-propane having a boiling point at 176°–178° C. at 0.01 mm.; $[\alpha]_D^{24}$=−13.3° (c.=1.0 methanol).

The compound (+)-1-(3-dichlorophenethyl)-2-methyl-6,7-dimethoxy-1,2,3,4-tetrahydroisoquinoline is a novel compound not specifically described in the prior art. Accordingly, the preparation of this compound is described herein, for completeness of disclosure, although neither this compound nor the preparation thereof is part of the present invention nor claimed as part of the present invention.

38 g. of racemic 1-(3,4-dichlorophenethyl)-2-methyl-6,7-dimethoxy-1,2,3,4-tetrahydrosioquinoline and 36 g. of dibenzoyl-D-tartaric acid were dissolved in 250 ml. of acetone. Ether was added until the solution became turbid whereupon the dibenzoyl tartrate of the (−)-base crystallized out. The precipitated crystals were separated by filtration and the filtrate was worked up to obtain the (+)-base in the manner which is described below. The crystals were twice dissolved and recrystallized from methanol-ether to obtain the dibenzoyl tartrate of the (−)-base, M.P. 149–151°; $[\alpha]_D^{25}$=−62.8° (c.=1 in methanol). To obtain the optically active base, the optically active dibenzoyl tartrate was partitioned between ether and dilute sodium hydroxide solution. The ethereal solution was separated, washed neutral and concentrated. The thus obtained basic portion was purified by distillation under high vacuum to obtain (−)-1-(3,4-dichlorophenethyl)-2-methyl - 6,7 - dimethoxy-1,2,3,4 - tetrahydroisoquinoline as a yellow oil, B.P. 200°/0.02 mm. It crystallized upon the addition of petroleum ether, M.P. 55–56°; $[\alpha]_D^{26}$=−11.0° (c.=1 in methanol).

To obtain the (+)-base, the filtrate obtained above was concentrated and the residue was partitioned between ether and dilute sodium hydroxide solution. There were obtained 13 g. of a basic portion which were dissolved in acetone with the calculated proportion of D-camphorsulfonic acid. Ether was added until the solution was turbid and the camphorsulfonate of the (+)-base crystallized spontaneously upon seeding. The camphorsulfonate of the (+)-base was dissolved and recrystallized from acetone-ether, M.P. 119–121°; $[\alpha]_D^{25}$=+21.4° (c.=1 in methanol).

To obtain the optically active base, 10 g. of optically active camphorsulfonate were partitioned between ether and dilute sodium hydroxide, worked up in the manner described above to obtain a basic portion which was purified by distillation under high vacuum. The (+)-1-(3,4-dichlorophenethyl) - 2 - methyl - 6,7 - dimethoxy - 1,2,3,4-tetrahydroisoquinoline boiled at 218°/0.1 mm. It crystallized upon the addition of petroleum ether; M.P. 55–56°; $[\alpha]_D^{26}$=+11.0° (c.=1 in methanol).

*Example 5*

1-(4-chlorophenethyl) - 2,3 - dimethyl - 6,7 - dimethoxy-1,2,3,4-tetrahydroisoquinoline was subjected to the reaction steps described in Example 1 to obtain 1-(2-n-propyl-4,5-dimethoxy-phenyl) - 1 - dimethylamino - 3 - (4- chlorophenyl)-propane having a boiling point of 155°–160° C. at 0.01 mm. and ultraviolet absorption maxima, in ethanol, at 278 and 283 mµ ε=3,390.

*Example 6*

1-phenethyl - 2 - methyl-6,7-dimethoxy-1,2,3,4-tetrahydroisoquinoline was subjected to the reaction steps described in Example 1 to obtain the following products:

1-phenethyl-2,2-dimethyl - 6,7 - dimethoxy-1,2,3,4-tetrahydroisoquinolinium iodide having a melting point of 154°–157° C.

1-(2 - vinyl-4,5-dimethoxyphenyl) - 1 - dimethylamino-3-phenyl-propane having a boiling point of 153°–155° C. at 0.02 mm.; $n_D^{20}$=1.5758.

Racemic 1-(2-ethyl-4,5-dimethoxyphenyl) - 1 - dimethylamino-3-phenyl-propane having a boiling point of 151°–152° C. at 0.02 mm. and ultraviolet absorption maxima, in ethanol, at 281 (shoulder), 284, and 288 (shoulder) mµ; ε=3335, 3420 and 3080; $n_D^{25}$=1.5527. The D-camphor sulfonate salt of the racemic base melted at 168°–169° C.

The 1-(2-ethyl-4,5-dimethoxyphenyl) - 1 - dimethylamino-3-phenyl-propane, thus obtained, was treated with a mixture of concentrated nitric acid in glacial acetic acid to yield 1 - (2-ethyl-4,5-dimethoxyphenyl)-1-dimethylamino-3-(4-nitrophenyl)-propane having a boiling point of 190° C. at 0.02 mm.; melting point of 72°–73° C. (crystallized from a methanol-water mixture); U.V. absorption maximum at 278 mµ; ε=13500, in ethanol.

The D-camphor sulfonate salt of 1-(2-ethyl-4,5-dimethoxy-phenyl) - 1 - dimethylamino-3-(4 - nitrophenyl)-propane melted at 219°–220° C.; $[\alpha]_D^{24}$=+17.3° (c.=1 in methanol).

We claim:
1. Compounds selected from the group consisting of tertiary amines having the formula:

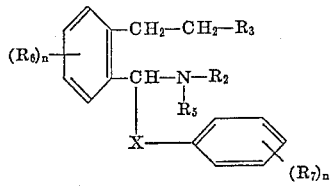

in which $R_2$ is a lower alkyl group; $R_3$ is a member selected from the group consisting of hydrogen and lower alkyl groups; $R_5$ is a lower alkyl group; $R_6$ is a member selected from the group consisting of methoxy and hydroxy groups; $R_7$ is a member selected from the group consisting of chlorine, fluorine, bromine and nitro; X is a divalent hydrocarbon radical having at least two carbon atoms, the valences of which are separated from each other by two carbon atoms; and $n$ represents an integer of from 1 to 3, inclusive, and salts of such tertiary amines with medicinally acceptable acids.

2. A tertiary amine having the formula:

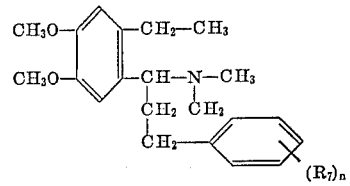

in which $R_7$ is a member selected from the group consisting of chlorine, fluorine, bromine and nitro; and in which $n$ represents an integer of from 1 to 3, inclusive.

3. Acid addition salts of the compounds of claim 2 with pharmaceutically acceptable acids.

4. Racemic 1-(2-ethyl-4,5-dimethoxyphenyl)-1-dimethylamino-3-(4-chlorophenyl)-propane.

5. (—)-1-(2-ethyl-4,5-dimethoxyphenyl) - 1 - dimethylamino-3-(4-chlorophenyl)-propane.

6. Racemic 1-(2-ethyl-4,5-dimethoxyphenyl)-1-dimethylamino-3-(3,4-dichlorophenyl)-propane.

7. (—)-1-(2-ethyl-4,5-dimethoxyphenyl) - 1 - dimethylamino-3-(3,4-dichlorophenyl)-propane.

References Cited in the file of this patent

FOREIGN PATENTS 200,131    Austria _____ Oct. 25, 1958

OTHER REFERENCES

Battersby et al.: "Jour. Chem. Soc. (London)," 1960, part 3, pages 3474–3477.

Pailer et al.: "Chemical Abstracts," vol. 43, page 2624 (1949).

UNITED STATES PATENT OFFICE
CERTIFICATE OF CORRECTION

Patent No. 3,138,639                      June 23, 1964

Arnold Brossi et al.

It is hereby certified that error appears in the above numbered patent requiring correction and that the said Letters Patent should read as corrected below.

Column 1, lines 35 to 42, the lower right-hand portion of the formula should appear as shown below instead of as in the patent:

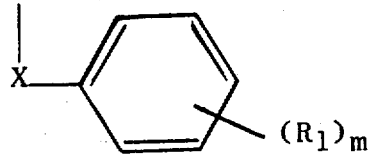

same column 1, line 64, for "Formula II" read -- Formula III --; column 6, line 21, for "(+)-1-(3-dichlorophenethyl)-2-" read -- (+)-1-(3,4-dichlorophenethyl)-2- --; line 61, after "of" insert -- the --; column 7, line 3, for "mµ" read -- mµ; --; column 8, lines 13 to 20, the formula should appear as shown below instead of as in the patent:

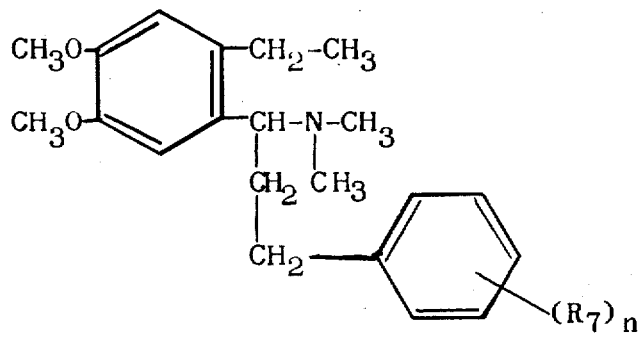

Signed and sealed this 4th day of May 1965.

(SEAL)
Attest:

ERNEST W. SWIDER                      EDWARD J. BRENNER
Attesting Officer                    Commissioner of Patents